Jan. 8, 1952  C. P. GEYER  2,581,526
CORN PLANTER WHEEL SHIELD
Filed Sept. 9, 1949

Inventor
CLARENCE P. GEYER

Attorney

Patented Jan. 8, 1952

2,581,526

UNITED STATES PATENT OFFICE 2,581,526

CORN PLANTER WHEEL SHIELD

Clarence P. Geyer, Mason City, Iowa

Application September 9, 1949, Serial No. 114,861

3 Claims. (Cl. 97—188)

1

This invention relates to agricultural implements, and more particularly to a shield or fender for use on the wheel of a corn planter to prevent clods of earth or corn stalks and similar debris from becoming entangled with the planter wheel and preventing its normal rotary movement.

A main object of the invention is to provide a novel and improved shield device for a corn planter wheel, such shield device being very simple in construction, being easy to install on a planter wheel, and preventing clods of earth and other debris from becoming entangled in the planter wheel and interfering with its proper rotation.

A further object of the invention is to provide an improved shield or fender device for a corn planter wheel, said device being very inexpensive to manufacture, being rugged in construction, providing protection against loosened soil, stalk fragments, and other debris, from interfering with the normal rotary movement of the corn planter wheel, and acting to prevent interference of debris with the planter wheel, whereby the planter wheel is prevented from skidding, and whereby excessive depth of planting of the seed is avoided.

Further objects and advantages of the invention will become apparent from the following description and claims, and from the accompanying drawings, wherein:

Figure 1:
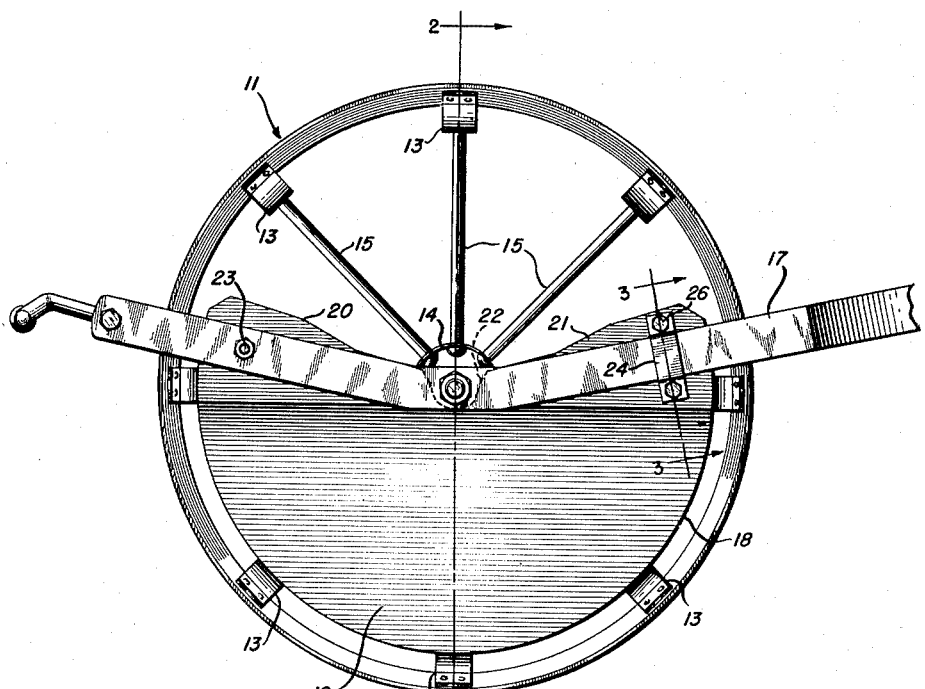
Figure 1 is a side elevational view of a corn planter wheel provided with a shield device constructed in accordance with the present invention.

Referring to the drawings, 11 generally designates a conventional corn planter wheel of the type having a pair of spaced rim segments 12, 12 connected by U-shaped loop members 13 and provided with a hub 14 connected to the brackets 13 by radial bolt members 15. The hub 14 is rotatably mounted on a transverse shaft member 16 which is secured at its respective ends to the drawbar elements 17, 17 in a conventional manner.

Designated at 18, 18 are respective shield members secured to the respective drawbar members 17 and covering the major portion of the lower half of the respective wheel rim segments 12, 12. Each shield member 18 comprises a semi-circular lower portion 19 which is downwardly and inwardly inclined, as shown in Figure 2, and verti-

2 cal top portions 20 and 21 at the respective rear and forward portions of the shield device, the top elements 20 and 21 being separated by an intermediate clearance notch formed in the member 18, said notch being shown at 22 and defining a clearance space through which the shaft member 16 passes. The rear element 20 is secured to the inside surface of the adjacent drawbar element 17 by means of a bolt 23. The forward element 21 is secured to the inside surface of the adjacent drawbar element 17 by a strap member 24 which straddles the drawbar element 17 and which is formed with end tabs 25, 25 secured by bolts 26, 26 to the element 21.

Figure 2:
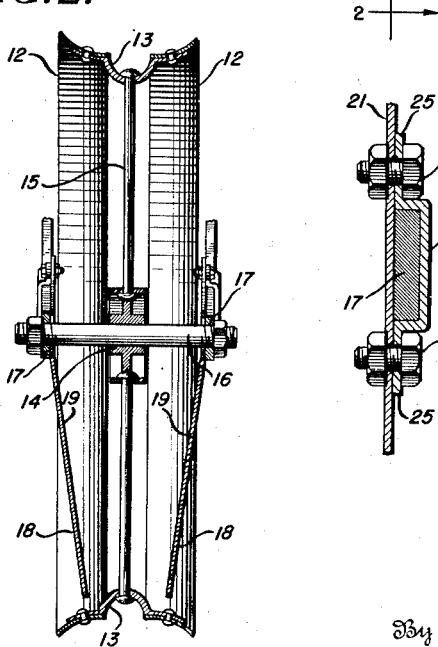
Figure 2 is a cross-sectional view taken on line 2—2 of Figure 1.
Figure 3:
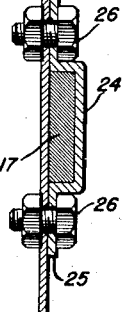
Figure 3 is an enlarged cross-sectional detail view taken on line 3—3 of Figure 1.

In operation, the wheel 11 is drawn along the path onto which it is desired to distribute the seed, the shield elements 18, 18 extending downwardly and inwardly with respect to the respective rim members 12, 12 of the wheel, as shown in Figure 2, the peripheral outer margins of the respective shields being closely adjacent to the respective rim members 12, 12, whereby entry of clods and debris into the space between the rim members 12, 12 is prevented. Since the clods and other debris cannot enter between the rim elements 12, 12, this material cannot interfere with the normal rotation of the planting wheel.

The lower elements 19 of the shields are preferably bent inwardly at an angle of approximately 20° to the vertical. The shield may be made of any suitable material, for example, sheet steel or the like.

While a specific embodiment of a wheel shield for corn planters has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a corn planter, a planting wheel comprising a pair of spaced rim members, means connecting said rim members and including a hub, a shaft extending rotatably through said hub, a pair of drawbar elements secured to the ends of said shaft, and respective semi-circular shield elements secured at their straight edges to said drawbar elements and extending downwardly and inwardly therefrom, the semi-circular margins of said shield elements extending inwardly and in concentric arrangement with their respective rim members.

2. In a planter, a planting wheel comprising a pair of spaced rim members, means connecting said rim members and including a center hub, a shaft rotatably disposed through said hub and having drawbars secured on its opposing ends, and respective semi-circular shield elements secured adjacent their straight edges to the drawbar and depending from the drawbars, said shield elements being bent inwardly from the drawbars and having their semi-circular margins disposed adjacent to the lower portions of the rims and in concentric arrangement therewith, vertical tabs projecting from the front and rear portions of the straight edges of the shields and disposed in parallel engagement of the inner surface of the drawbars and means connecting said tabs to the drawbars.

3. In a planter, a planting wheel comprising a pair of spaced rim members, means connecting said rim members and including a center hub, a shaft rotatably disposed through said hub and having drawbars secured on its opposing ends, and respective semi-circular shield elements carried by the drawbars, upstanding tabs formed on the front and rear portions of the straight edges of the shields, means affixing said tabs to the inner surfaces of the drawbars, said shields depending from the drawbars and being bent inwardly, and said semi-circular margins of the shields being positioned centrally of the lower portions of the hub members and in concentric spaced arrangement therewith.

CLARENCE P. GEYER.

REFERENCES CITED

The following references are of record in the file of this patent:

UNITED STATES PATENTS

| Number | Name | Date |
|---|---|---|
| 698,913 | Evants | Apr. 29, 1902 |
| 729,263 | Boothe | May 26, 1903 |
| 774,706 | Smith | Nov. 8, 1904 |
| 1,004,655 | Johnson | Oct. 3, 1911 |
| 1,876,776 | Smith | Sept. 13, 1932 |